United States Patent [19]

Nufer et al.

[11] Patent Number: 4,489,800

[45] Date of Patent: Dec. 25, 1984

[54] TEMPERATURE-COMPENSATED WEIGHING APPARATUS

[75] Inventors: Bruno Nufer, Zürich; Paul Lüchinger, Uster, both of Switzerland

[73] Assignee: Mettler Instrumente AG, Greifensee, Switzerland

[21] Appl. No.: 517,640

[22] Filed: Jul. 27, 1983

[30] Foreign Application Priority Data

Aug. 20, 1982 [CH] Switzerland .......................... 4976/82

[51] Int. Cl.³ .......................... G01G 3/18; G01G 7/02
[52] U.S. Cl. .......................... 177/212; 177/210 EM; 177/DIG. 5
[58] Field of Search .......... 177/212, 210 EM, DIG. 5

[56] References Cited

U.S. PATENT DOCUMENTS 4,150,730  4/1979  Knothe et al. ...................... 177/212
4,159,747  7/1979  Realini ........................ 177/210 EM
4,168,756  9/1979  Enzmann et al. ........ 177/DIG. 5 X Primary Examiner—E. A. Goldberg
Assistant Examiner—Patrick W. Foster
Attorney, Agent, or Firm—Laubscher, Philpitt & Laubscher

[57] ABSTRACT

Electromagnetic load compensation weighing apparatus including a temperature correction circuit having a temperature-responsive element mounted in heat sensing relation relative to the permanent magnet, characterized by the further mounting of a component of the compensating current supply circuit in heat-responsive relation relative to the permanent magnet. A Zener diode serving as a reference voltage device in the compensating current supply circuit is preferably the component that is mounted, together with the temperature-responsive element, in heat conducting relation in a common bore contained within the permanent magnet.

5 Claims, 2 Drawing Figures

TEMPERATURE-COMPENSATED WEIGHING APPARATUS

BRIEF DESCRIPTION OF THE PRIOR ART

Weighing systems of the electromagnetic load compensation return-to-zero type are well known in the patented prior art, as evidenced, for example, by the prior, patents, to Kunz U.S. Pat. Nos. 3,786,678, 3,786,883, 4,109,738 and 4,184,556, Allenspach U.S. Pat. No. 3,786,884, Baumgartner U.S. Pat. No. 3,677,357, Strobel U.S. Pat. No. 3,688,854 and Baumann et al. U.S. Pat. No. 3,816,156 among others.

In these known systems, the magnitude of the compensating current—which is supplied to a load compensation coil connected with the load carrier and arranged for movement in a stationary permanent magnet field to return the carrier to is initial no-load position—affords an indication of the magnitude of the load which is applied to the carrier.

In order to increase the operating accuracy of the electromagnetic load compensation weighing systems, it has been proposed to provide a temperature correction circuit includin.g a temperature-responsive variable resistor arranged within an opening contained in the permanent magnet core. Examples of such temperature correction systems are shown by the Kunz U.S. Pat. No. 4,280,577 and, the Knother et al U.S. Pat. No. 4,091,886.

The correction network in the electrical mechanism influences the dimension of the load-dependent compensation current in such a manner that the temperature dependency of the magnetic field intensity of the permanent magnet system is extensively compensated.

Circuit elements of the electrical device, which are decisive in determining the compensation current flowing through the load compensation coil, are likewise more or less heavily dependent on the temperature in terms of their properties. An additional aggravating fact is that the temperature development of these circuit elements differs from that of the permanent magnet system and that therefore it is impossible to achieve a thermal balance within the scale to the desired degree, and that such a balance is entirely unattainable in short-range terms. The disturbing consequences of the temperature dynamics, resulting from the different heat behaviour of the scale parts, among other things, are the instability of the zero point, and changes in the sensitivity, especially when the scale is activated and in case of major load changes.

It is, of course, known that temperature-sensitive circuit elements can be isolated from temperature influence, for example, by maintaining the same at a constant temperature by means of a regulated heating device. Measures of this kind, however, are generally rather expensive and require additional energy. For example, electromagnetic load-compensating scales as a rule contain a reference voltage source with a Zener diode. In practice, Zener diodes are equipped with a heating unit in order to attain the desired temperature constancy. Heatable Zener diodes, however, are much more expensive than those without the heating device. Besides, the increased heat noise of the Zener diode resulting from heating restricts the reading sensitivity of the scale.

SUMMARY OF THE INVENTION

It was the purpose of the present invention to achieve an improvement in the temperature compensation with less expensive means. The solution of this problem according to the invention consists in the fact that at least a part of the circuit elements of the electrical device with temperature-dependent properties, which are decisive in determining the compensation current, is likewise arranged inside the magnetic core. In this manner, there is achieved at least approximately a parallel temperature development with respect to the permanent magnet system for the circuit elements concerned, so that, in general, a single temperature sensor will suffice for the required temperature compensation, whereby the provision of additional compensation measures in the electrical device is avoided.

In a scale, whose electrical device contains a reference voltage source with a Zener diode, it is primarily this Zener diode which is a circuit element with temperature-dependent properties that is decisive for the determination of the compensation current. A preferred version of the invention therefore in this connection resides in the fact that the Zener diode and the temperature sensor are arranged in a common cavity of the magnetic core and are thermally connected with the wall of the cavity. If desired, one can also place other temperature-sensitive circuit elements in the same or other cavities in the permanent magnet means.

Accordingly, a primary object of the present invention is to provide a weighing apparatus of the electromagnetic load compensation type including a temperature-responsive correction circuit, wherein a component of the constant-current compensating current supply means–preferably, the Zener diode reference voltage device–is also mounted in heat-responsive relation to the permanent magnet means. Preferably, a heat-conductive paste is used to mount the temperature-responsive resistor and the Zener diode on a wall portion of a common central bore in which the components are arranged. In the preferred embodiment, the temperature-responsive resistor is connected in a temperature-correcting bridge circuit that is connected across the Zener diode.

BRIEF DESCRIPTION OF THE DRAWING

Other objects and advantages of the invention will become apparent in the light of the accompanying drawing, in which.

DETAILED DESCRIPTION

Figure 1:
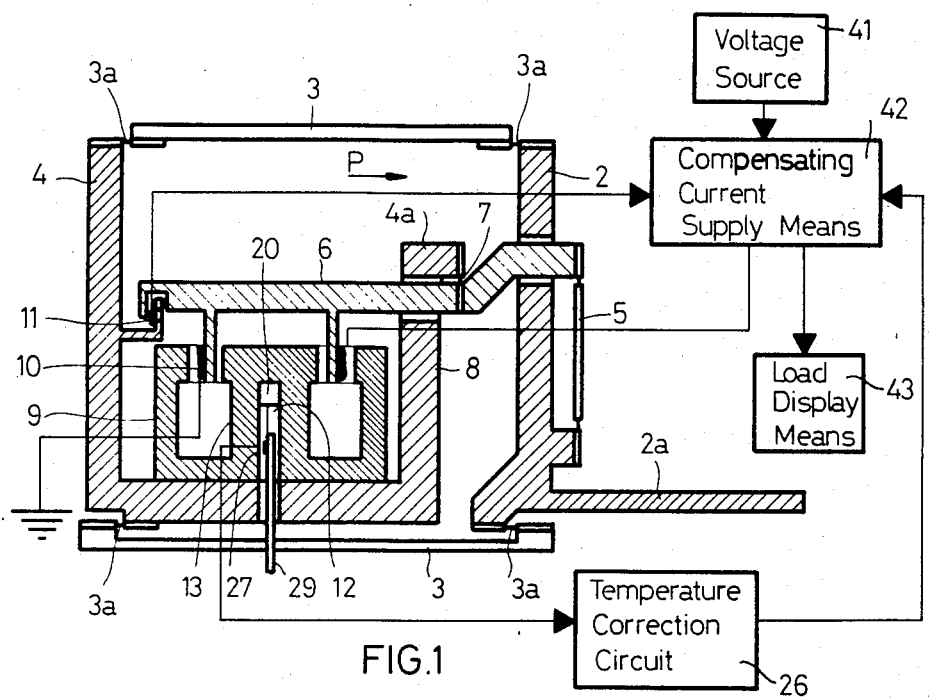
FIG. 1 is a schematic diagram of the electromagnetic load compensation weighing apparatus of the present invention.

Referring first more particularly to FIG. 1, the weighing apparatus of the present invention includes a load carrier 2 having a scale platform 2a attached thereto, said load carrier being connected for vertical movement relative to the stationary frame 4 by parallel upper and lower guide arms 3 and flexible bearings 3a, as is known in the art. Pivotally suspended intermediate its ends from a vertical standard portion 4a of the frame by flexible bearing 7 is a horizontal lever 6, one end of the lever being connected with the load carrier by a coupling link 5. Connected with the other end of the lever 6 is an annular electromagnetic load compensation coil 10 that extends within the magnetic field defined within an annular air gap contained within a pot-shaped permanent magnet 9 mounted on the frame 4. Position sensing means 11 in the form of an optical-electrical sensor is connected with the frame for sensing the displacement of the lever 6 when carrier 2 is displaced from its normal no-load position upon the application of a load to be measured to the scale platform 2a.

As is well known in the prior art (as evidenced, for example, by the aforementioned Allenspach U.S. Pat. No. 3,786,884), compensating current supply means 42 connected with a voltage source 41 are provided for supplying compensating current to the load compensation coil 10 when the carrier 2 is displaced from its normal no-load position by the application of a load to be measured to the scale platform 2a. Thus, the optical-electrical position sensing means 11 provides a position signal P that controls the operation of the compensating current supply means to supply high-frequency current pulses to the load compensation coil 10, the magnitude of the effective compensating current being a function of the applied load, as displayed on the load display means 43. Thus, the compensating current is generated from the constant current source by converting means controlled by a regulating device which provide current pulses of constant level and variable duration.

Figure 2:
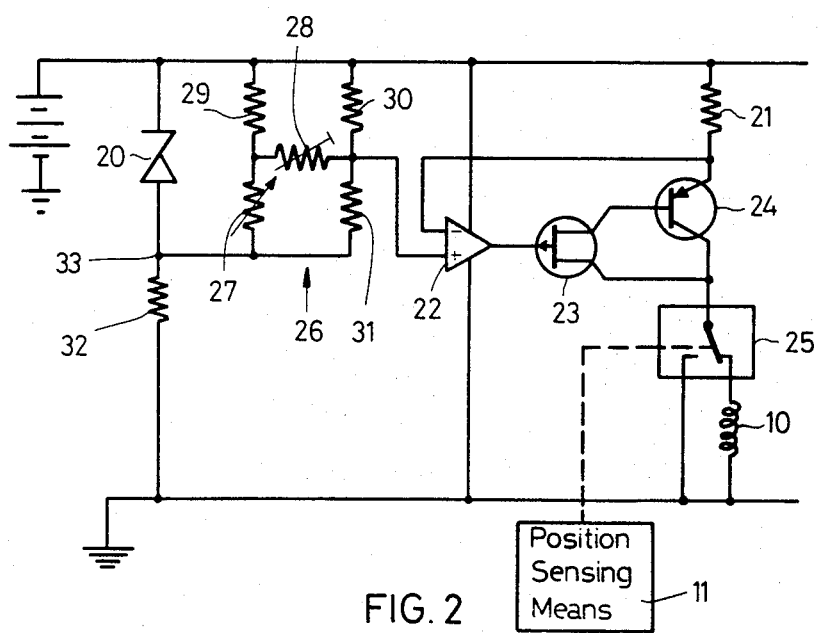
FIG. 2 is an electrical schematic diagram of the compensating current supply means of the apparatus of FIG. 1.

Referring to the electrical schematic diagram of FIG. 2, the compensating current supply means includes an output circuit connected across the voltage source 41 and including a switching circuit 25 operable to connect the compensation coil 10 in series with the output transistor 24 and the precision resistor 21. While the switching circuit has been diagrammatically illustrated by the symbol of a simple switch, it is apparent that this switching operation is controlled by the position sensing means 11 in a manner similar to the electronic circuitry of the aforementioned Allenspach U.S. Pat. No. 3,786,884. A reference voltage circuit including Zener diode 20 and level resistor 32 is connected across the voltage source, the reference voltage junction 33 being connected with one input terminal of the constant current operation amplifier 22 via a temperature compensation resistance bridge circuit 26. The resistor 27 in one arm of bridge 26 is a temperature-responsive variable resistor that is mounted in a central bore 12 contained in the permanent magnet 9, the other bridge arm resistors 29, 30, and 31 being fixed resistors. An adjustable resistor 28 is connected diagonally across the bridge arms for voltage adjustment purposes. The other input to the operational amplifier 22, which is connected as a voltage follower, is taken from the junction between precision resistance 21 and output transistor 24, the output of the operational amplifier being connected with the input of a field effect transistor 23, which transistor has output terminals connected across the base and collector electrodes of the output transistor 24. The current of output transistor 24, which is maintained constant, flows either through the load compensation coil 10 or to ground, depending on the condition of the switching means 25 as determined by the position indicating means 11.

In accordance with a characterizing feature of the invention, the Zener diode 20 is physically mounted in the central bore 12 in the permanent magnet 9 together with the temperature sensing variable resistor 27, the components being thermally connected with the wall of the bore 12, for example, by means of a known heat conductive silicon-base paste. These elements—and, if desired, other components of the circuit of FIG. 2—may be supported on a circuit board 29 that extends within the bore 12.

By mounting the Zener diode 20 within the heat zone of the permanent magnet system, the deviations in the reading sensitivity after activation of the weighing scale may be diminished in the shortest time.

A further improvement in temperature compensation can be achieved by including other less temperature-dependent circuit elements, for example, the precision resistor 21, in the heat zone of the permanent magnet system 9 in the same manner.

In the case of scales with analog compensation, where, in other words, a direct-current compensating current of load-dependent intensity flows through the magnetic coil and the current is digitalized for reading indication, the electrical device may likewise contain circuit elements with temperature-dependent properties which are decisive for the determination of the compensation current, for example, a reference voltage source in the analog-example, to-digital (A/D) converter. In this case likewise, the solution according to the invention can be used with relation to the arrangement of the temperature-dependent circuit elements.

What is claimed is:

1. In a weighing apparatus of the load-compensation return-to-zero type including a stationary permanent magnet (9) mounted on a frame (4), a load carrier (2) connected for movement between no-load and load positions relative to the frame, a compensation coil (10) connected with the load carrier for movement in the magnetic field of the permanent magnet, means responsive to the displacement of the load carrier from the no-load position for supplying to the coil compensating current of a magnitude to return the carrier to the no-load position, and temperature compensating means (26) including a temperature sensor (27) arranged within a bore (12) contained in the permanent magnet for varying the magnitude of the compensating current;

the improvement wherein said compensating current supply means includes at least one non-sensing component (20) that is arranged in temperature-responsive relation within a bore contained in said permanent magnet, whereby the necessity for further temperature compensation means for the components of the compensating current supply means is avoided.

2. In a weighing apparatus of the load-compensation return-to-zero type including a stationary permanent magnet (9) mounted on a frame (4), a load carrier (2) connected for movement between no-load and load positions relative to the frame, a compensation coil (10) connected with the load carrier for movement in the magnetic field of the permanent magnet, means (42) responsive to the displacement of the load carrier from the no-load position for supplying to the coil compensating current of a magnitude to return the carrier to the no-load position, and temperature compensating means (26) including a temperature sensor (27) arranged within a bore (12) contained in the permanent magnet for varying the magnitude of the compensating current;

the improvement wherein said compensating current supply means includes a Zener diode (20), and means (32) connecting said Zener diode to establish a reference voltage, said Zener diode being mounted within the the same bore as said temperature sensor.

3. Apparatus as defined in claim 2, and further including heat conductive means mounting said Zener diode and said temperature sensor in heat sensing relation on a wall portion of the magnet bore.

4. Apparatus as defined in claim 2, wherein said temperature sensor is connected in one arm of a resistance bridge circuit (26), said bridge circuit being connected across said Zener diode.

5. Apparatus as defined in claim 4, wherein said compensating current supply means is of the constant current type including means (24) operable by said bridge circuit (26) for adjusting the operating level of the constant current, and means (25) operable by said position sensing means for periodically interrupting the constant current compensating current as a function of the displacement of the load carrier from the no-load position, whereby the effective magnitude of the compensating current corresponds with the weight mass applied to said load carrier.

* * * * *